United States Patent [19]

Stewart et al.

[11] 4,335,661
[45] Jun. 22, 1982

[54] FLUIDIZED BED HEAT EXCHANGER HAVING AN AIR ASSISTED BED DRAIN

[75] Inventors: Robert D. Stewart, Verona; Thomas E. Taylor, Bergenfield, both of N.J.

[73] Assignee: Foster Wheeler Energy Corporation, Livingston, N.J.

[21] Appl. No.: 190,299

[22] Filed: Sep. 24, 1980

[51] Int. Cl.³ .............................................. F23G 7/00
[52] U.S. Cl. .................................... 110/245; 122/4 D; 432/58
[58] Field of Search ............... 110/245, 347; 122/4 D; 432/58, 15

[56] References Cited

U.S. PATENT DOCUMENTS

| | | | |
|---|---|---|---|
| 3,881,857 | 5/1975 | Hoy et al. | 431/7 |
| 4,177,742 | 12/1979 | Uemura et al. | 110/245 |
| 4,227,488 | 10/1980 | Stewart et al. | 110/245 |
| 4,240,364 | 12/1980 | Bryers et al. | 110/245 |
| 4,253,425 | 3/1981 | Gamble et al. | 110/245 |

FOREIGN PATENT DOCUMENTS

| | | | |
|---|---|---|---|
| 2303452 | 8/1973 | Fed. Rep. of Germany | 110/245 |
| 769267 | 3/1957 | United Kingdom | |

*Primary Examiner*—Henry C. Yuen
*Attorney, Agent, or Firm*—Marvin A. Naigur; John E. Wilson; Warren B. Kice

[57] ABSTRACT

A fluidized bed heat exchanger in which a perforated plate is disposed within a housing for supporting a bed of particulate material. Air is passed through the plate to fluidize the particulate material and nozzles are provided for distributing air across the inlet end of a drain pipe for the spent particulate material to insure a continuous draining of the material.

7 Claims, 3 Drawing Figures

FLUIDIZED BED HEAT EXCHANGER HAVING AN AIR ASSISTED BED DRAIN

BACKGROUND OF THE INVENTION

This invention relates to a fluidized bed heat exchanger and more particularly, to a heat exchanger in which heat is generated by the combustion of particulate fuel in a fluidized bed.

The use of fluidized beds has long been recognized as an attractive way of generating heat. In a normal fluidized bed arrangement, air is passed through a perforated plate or grid supporting material which usually includes a mixture of a fuel material, such as high sulfur bituminous coal, and an adsorbent material for the sulfur released as a result of the combustion of the coal. As a result of the air passing through the bed, the bed behaves like a boiling liquid which promotes the combustion of the fuel. The basic advantages of such an arrangement include a relatively high heat transfer rate, substantially uniform bed temperature, combustion at relatively low temperatures, ease of handling the coal, a reduction in corrosion and boiler fouling and a reduction in boiler size.

In the fluidized bed combustion process, the coal and adsorbent are continuously introduced into the bed by suitable feeders, injectors, or the like and the spent coal and adsorbent are discharged from the lower portion of the bed, usually through a gravity drain pipe having one end registering with a discharge opening formed through the perforated support plate and the other end communicating with a screw cooler, a conveyor belt, or the like. However, in arrangements in which the size of the coal extends over a relatively large range, the relatively larger pieces of coal tend to migrate to an area above the drain pipe and form a dense area that is difficult, if not impossible, to fluidize. As a result, the large pieces of coal do not drain, but rather cause a clogging of the drain pipe and an attendant severe curtailment in the operating efficiency of the bed.

SUMMARY OF THE INVENTION

It is therefore an object of the present invention to provide a fluidized bed heat exchanger in which adequate draining of the spent bed materials is achieved despite the use of materials having a relatively wide particle size range.

It is a further object of the present invention to provide a fluidized bed heat exchanger of the above type in which nozzles are provided for distributing air across the drain inlet to fluidize the bed materials in the immediate area and insure a continuous draining of the spent materials.

Toward the fulfilment of these and other objects, the heat exchanger of the present invention includes means for introducing air through perforations in a plate to fluidize particulate material supported by the plate. A drain pipe communicates with the plate for discharging spent particulate material and air is discharged over the inlet of the drain pipe to promote the flow of spent material into the pipe.

DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in connection with the accompanying drawings in which.

DESCRIPTION OF THE PREFERRED EMBODIMENT

Figure 1:
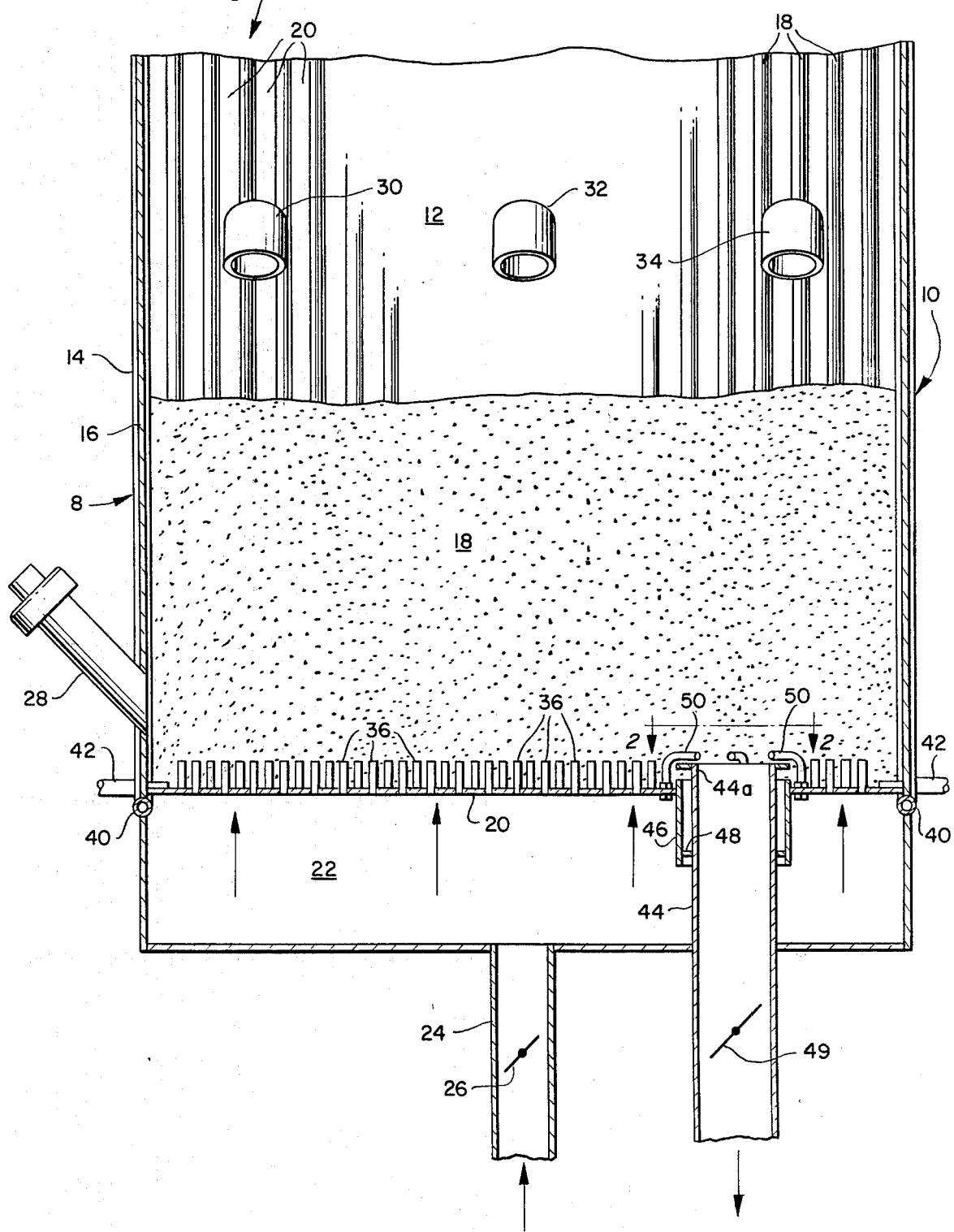
FIG. 1 is a vertical sectional view of the fluidized bed combustor of the present invention.

Referring to FIG. 1 of the drawings, the reference numeral 6 refers in general to an enclosure forming a major portion of a fluidized bed heat exchanger which may be in the form of a boiler, a combustor, a process reactor or any similar type device. The enclosure 6 consists of a front wall 8, a rear wall 10, and two sidewalls, one of which is shown by the reference numeral 12. Each wall is formed by a plurality of vertically-extending tubes 14 disposed in a spaced, parallel relationship and connected together by a plurality of elongated fins 16 extending for the entire lengths of the tubes and connected to diametrically opposed surfaces of the tubes in a conventional manner. The upper portion of the enclosure 6 is not shown for the convenience of presentation, it being understood that it consists of a convection section, a roof and an outlet for allowing the combustion gases to discharge, also in a conventional manner.

A bed of particulate material, shown in general by the reference numeral 18 is disposed within the combustor 10 and rests on a perforated plate 20 extending horizontally in the lower portion of the boiler. The bed 18 can consist of a mixture of discrete particles of fuel material such as bituminous coal, and an adsorbent, such as limestone, for adsorbing the sulfur released by the combustion of the fuel material.

An air plenum 22 is provided immediately below the plate 20 and an air inlet pipe 24 is provided through the plenum for distributing air from an external source (not shown) to the plenum under the control of a valve 26. Since the valve 25 can be of a conventional design it will not be described in any further detail. A bed light-off burner 28 is mounted through the front wall 12 immediately above the plate 20 for initially lighting off the bed 18 during startup.

Three overbed feeders 30, 32 and 34 are provided which extend through a sidewall 12. The feeders 30, 32 and 34 receive particulate coal from inlet ducts or the like, and are adapted to feed the coal particles onto the upper surface of the bed 18. The feeders 30, 32 and 34 can operate by gravity discharge or can be in the form of spreader feeders or any other similar device. It is understood that feeders identical to the feeders 30, 32 and 34 can also be provided through one or more of the front wall 8, the rear wall 10 and the other side wall 12, and that similar feeders can also be provided for discharging the adsorbent onto the bed 18.

A plurality of air distributors 36 extend through a plurality of spaced openings extending through the plate 20. The distributors 36 are in the form of vertically disposed tubular members that are secured to the plate 20 in any conventional manner such as by bolting or welding. The distributors 36 extend upwardly from the plate 20 for a predetermined distance into the bed 18 of particulate material and their lower ends receive air from the plenum 22. After passing through the length of the distributors 36, the air discharges outwardly into the fluidized bed at the predetermined distance from the plate 20. As a result, a dormant layer of particulate material is formed between the upper surface of the plate 20 and the upper ends of the distributors 36 for reasons that will be discussed later.

A pair of horizontal headers 40 are connected in fluid communication with the tubes 14 forming the front wall 8 and the rear wall 10, and another pair of horizontal headers 42 are connected in fluid communication with the tubes 14 forming the side walls 12. It is understood that headers similar to the headers 40 and 42 are provided in communication with the upper ends of the walls 8, 10 and 12. As a result, a fluid to be heated can be sequentially or simultaneously passed through the walls 8, 10 and 12 to pick up the heat from the fluidized bed in a conventional manner.

A drain pipe 44 extends through the air plenum 22 and has an inlet end portion 44a that extends through, and projects slightly upwardly from, an enlarged opening formed in the plate 20. A support ring 46 is provided which extends within the latter opening and is secured thereto in any known manner, such as by welding. The ring 46 extends into the plenum 22 and is connected to the drain pipe 44 by an annular support member 48. A flow control valve 49 is provided in the lower portion of the drain pipe 44 and operates in a conventional manner to selectively control the discharge of material from the latter pipe, as will be described later.

Figure 2:
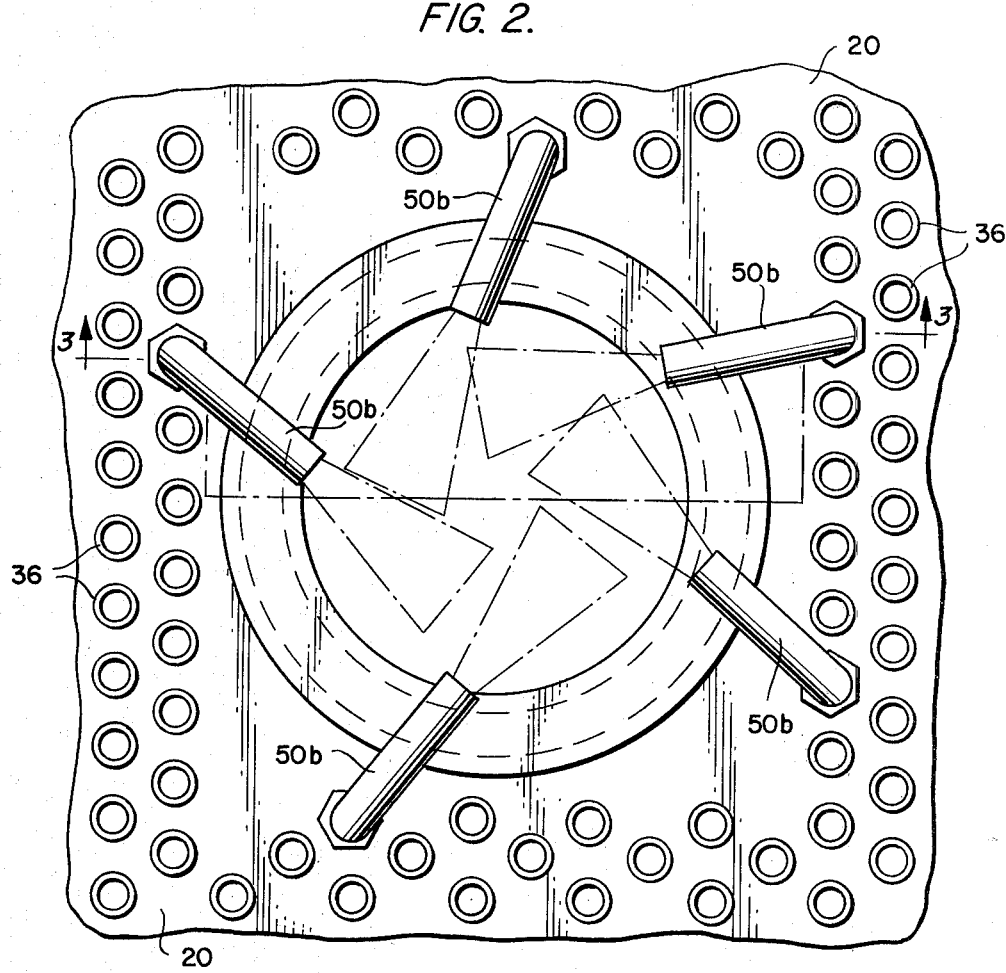
FIG. 2 is a partial enlarged plan view depicting a portion of the combustor of FIG. 1.
Figure 3:
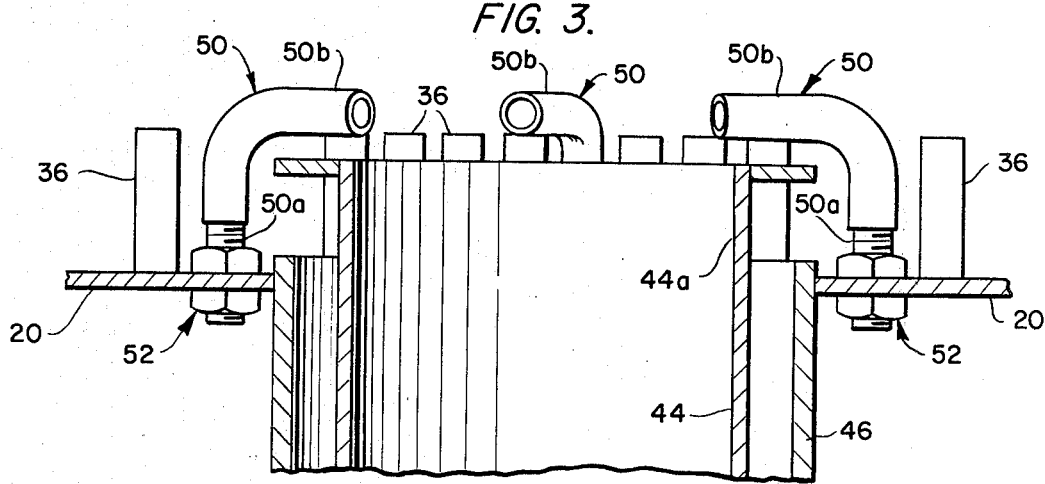
FIG. 3 is a cross-sectional view taken along the lines 3—3 of FIG. 2.

Five air discharge nozzles 50 are spaced around the upper end portion of the drain pipe 44 and are better shown in FIGS. 2 and 3. Each nozzle 50 has a vertically extending threaded portion 50a which extends through corresponding openings formed in the plate 20 and which is bolted to the plate by bolt assemblies 52, in a conventional manner. Each nozzle 50 is bent at approximately a ninety degree angle to form a horizontally extending portion 50b which extends over the upper end portion 44a of the drain pipe 44. As shown in FIG. 2, the portions 50b of the nozzles 50 extend generally towards the axis of the drain pipe 44 but are slightly offset in a radial sense relative to the latter pipe.

The lower end portions 50a of the nozzles 50 receive air from the plenum 22 and discharge same over the upper end portion of the drain pipe 44 and generally towards its axis in the approximate patterns shown by the dashed lines in FIG. 2.

In operation, the valve 26 associated with the air inlet pipe 24 is opened and air passes up through the plenum 22 and into the inlet ends of the distributors 36 and the nozzles 50. The air flows upwardly through the lengths of the distributors 36 before it discharges from the outlet ends of the distributors into the bed 18 at a plane above the plane of the plate 20. Thus, that portion of the particulate material in the bed 18 extending immediately above the outlet ends of the distributors 36 is fluidized while the portion extending between the latter ends and the upper surface of the plate 20 remains dormant, or stagnant.

The light-off burner 28 is then fired to heat the material in the bed until the temperature of the material reaches a predetermined level, at which time particulate fuel is discharged from the feeders 30, 32 and 34, and adsorbent material is discharged from other feeders (not shown) onto the upper surface of the bed 18 as needed.

After the bed 18 has been fluidized and has reached a predetermined elevated temperature in accordance with the foregoing, the light-off burner 28 is turned off while the feeders 30, 32 and 34 continue to distribute particulate fuel to the upper surface of the bed in accordance with predetermined feed rates. As a result of the foregoing, the dormant layer of particulate material extending between the upper surface of the plate 20 and the outlet ends of the distributors 36 acts as an insulator for the plate 20.

Air discharging from the nozzles 50 across the upper end of the drain pipe 44 fluidizes the material accumulating around the drain pipe and thus prevents large particulate material from clogging in the inlet to the drain pipe and enables the spent adsorbent as well as the spent fuel material, primarily in the form of ashes, to enter the pipe 44, where it passes through the pipe 44 under control of the valve 49 and discharges from the outlet end portion 44b to a screw cooler, conveyor belt, or the like.

Fluid, such as water, to be heated is passed into the headers 40 and 42 where it passes simultaneously, or in sequence, through the tubes 18 forming the walls 8, 10 and 12 to add heat from the fluidized bed to the fluid before it is passed to external apparatus for further processing.

As a result of the foregoing, the area immediately above the inlet end portion 44a of the drain pipe 44 will remain fluidized, notwithstanding the presence of particulate fuel material of a relatively large size, while the particulate material in the remaining areas immediately above the plate 20 is dormant and thus functions to insulate the plate from the relatively high temperature in the bed 18.

It is understood that variations in the above arrangement can be made without departing from the scope of the invention. For example, the invention is not limited to the use of five nozzles located and spaced in the exact manner shown, since the number and location of the nozzles can be varied within the scope of the invention.

It is understood that other modifications, changes and substitutions are intended in the foregoing disclosure and in some instances some features of the invention will be employed without a corresponding use of other features. Accordingly, it is appropriate that the appended claims be construed broadly and in a manner consistent with the spirit and scope of the invention.

What is claimed is:

1. A fluidized bed heat exchanger comprising a perforated plate adapted to support a bed of particulate material, means for introducing air through the perforations to fluidize said particulate material, means for introducing additional particulate material to said bed, a drain pipe communicating with said bed for discharging spent particulate material from said bed, and means for discharging air over the inlet of said drain pipe to promote the flow of spent material into said pipe, the air discharging means comprising a plurality of nozzles each defined by a pipe having a first portion extending up from said plate and a second portion extending at an angle to said first portion and over said inlet of said drain pipe.

2. The heat exchanger of claim 1 wherein said inlet of said drain pipe registers with an opening extending through said perforated plate.

3. The heat exchanger of claim 1 wherein said air introducing means includes an air plenum extending below said perforated plate.

4. The heat exchanger of claim 1 wherein said nozzles extend through openings formed through said plate and receive said air from said air plenum.

5. The heat exchanger of claim 1 wherein said air discharging means is constructed and arranged to direct the air generally towards the axis of said drain pipe.

6. The heat exchanger of claim 1 further comprising a plurality of air distributors extending upwardly from said plate and registering with said perforations for receiving said fluidized air and discharging said air into said bed at a plane above said plate.

7. The heat exchanger of claim 6 wherein the length of said air distributors are such that the material accumulating above said plate and below the discharge ends of said distributors insulates said plate from the high temperature in said bed.

* * * * *